Aug. 31, 1965  H. J. DE LONG  3,203,035
POULTRY PICKING APPARATUS
Filed June 20, 1963  2 Sheets-Sheet 1

Inventor
Horace J. De Long
By George E. Frost – Keith J. Kulie
Attorneys

Aug. 31, 1965  H. J. DE LONG  3,203,035
POULTRY PICKING APPARATUS
Filed June 20, 1963  2 Sheets-Sheet 2
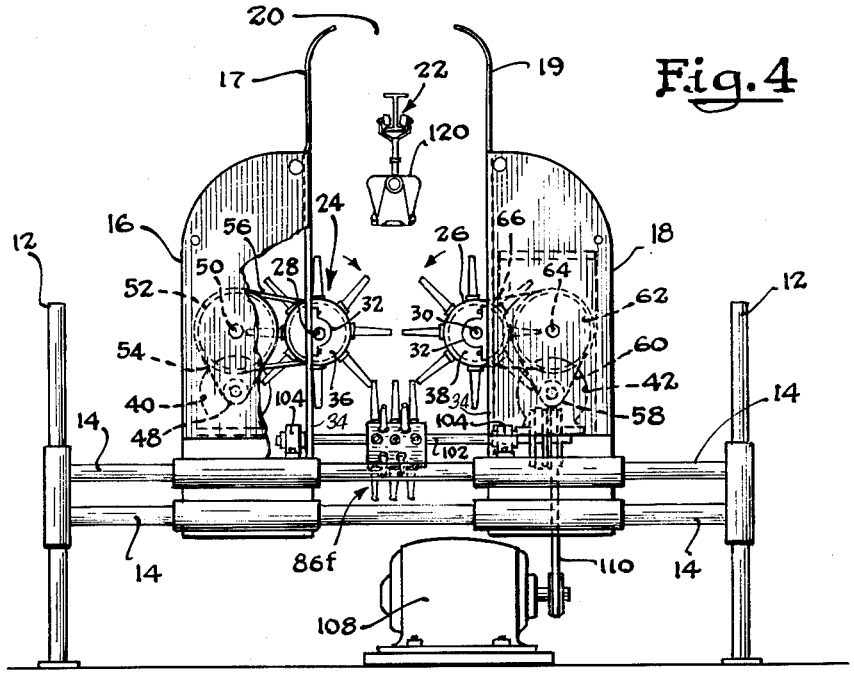
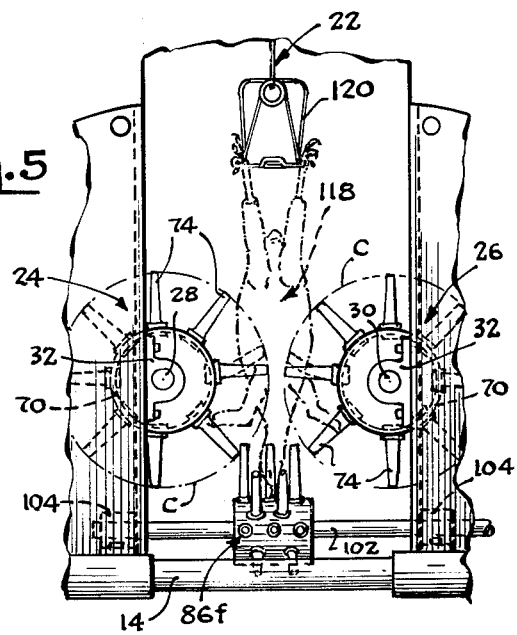
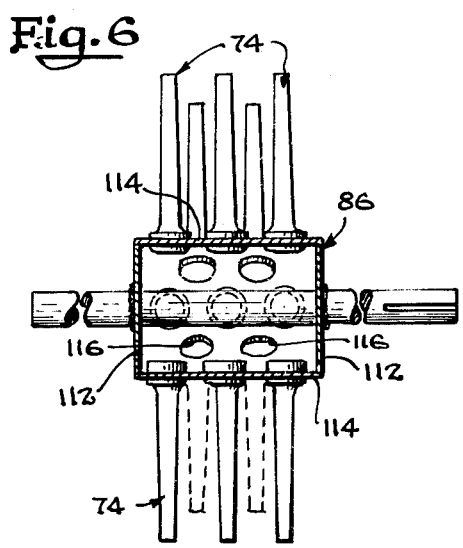
Inventor
Horace J. DeLong
By George E. Frost - Keith J. Kulie
Attorneys

United States Patent Office 3,203,035
Patented Aug. 31, 1965

3,203,035
POULTRY PICKING APPARATUS
Horace J. De Long, Gainesville, Ga., assignor to Gainesville Machine Company, Inc.
Filed June 20, 1963, Ser. No. 289,279
8 Claims. (Cl. 17—11.1)

The present invention relates to poultry picking apparatus and more particularly it relates to an improvement over applicant's prior U.S. Patent No. 3,044,108, issued July 17, 1962, entitled "Rotary Drum-Type Chicken Picking Machine," to provide picking apparatus adapted to remove all of the feathers from poultry in a continuous operation, support for the bird during picking and means for varying the picking speed and action.

Defeathering of poultry today is a necessary step in the processing of fowl for the market. The defeathering operation has been mechanized to the point where poultry may be placed upon a continuous conveyor, passed through a scalding solution to relieve the tight engagement of the quills in the epidermal layers, and then moved along through picking means to remove the feathers. Primarily, the picking step involves passage of the fowl along a series of resilient fingers which fingers move over the fowl in a wiping action to pull the feathers away from engagement with the fowl.

Various apparatus have from time to time been developed directed to means for movement of the fingers with respect to the bird. Some involve tumbling of the bird in a moving drum having resilient fingers therein while still others involve manually holding a bird against a rotating drum with fingers projecting therefrom.

The continuously moving conveyor line presently holds considerable attraction in processing and picking means involving rotating drum pickers have been developed to accommodate such continuous processing equipment. The rotating drum type of picking apparatus involves a limitation in that the bird must be processed through more than one picking step to remove all of the feathers therefrom, especially those feathers on the suspended bird on the neck, under the wings, and the feathers on the head and shoulders.

In accordance with the present invention a poultry picking apparatus is provided that is intended to remove all of the feathers of the bird during a continuous picking sequence in the processing cycle, to position and support the bird to optimum picking positions during the defeathering of said poultry and to vary the speed and picking action of the apparatus. The picking apparatus set forth herein includes a pair of rotating top drums one mounted along either side of the path traversed by the poultry through the apparatus said top drums adapted to act one upon either side of the poultry and a series of lower rotating drums whose axes are disposed at an angle to the upper top rotating drums, the lower or bottom drums adapted to defeather the bottom face of the wings, the neck, shoulders and heads of the poultry and to regulate the motion and position of the poultry as it passes through the picking apparatus.

It, accordingly, is a general object of the present invention to provide an improved poultry defeathering apparatus.

Another object of the present invention resides in the provision of a poultry picking apparatus having top drums to pick the main body of the poultry and bottom drums to pick the remainder of the poultry body.

A further object of the present invention resides in the provision of an improved poultry picking apparatus having a pair of opposed rotating top drums and a series of rotating bottom drums to regulate the position and motion of the poultry as it pases through the picking apparatus.

An additional object of the present invention is to provide an improved poultry picking apparatus having drum means to regulate, within a range, the picking action of the apparatus independent of the speed of the conveyor which moves the poultry along the processing line.

Another object of the present invention is to provide an improved poultry picking apparatus having a series of bottom drums to support the poultry as it moves through the picking apparatus to inhibit bruising or other damage to the poultry by the top rotating drums of the apparatus.

A further object of the present invention resides in the provision of an improved picking apparatus having means to inhibit the reciprocatory action of the bird in direction normal to the picking action of the picking drums.

Still another object of the present invention resides in the provision of an improved poultry picking apparatus having a series of rotating bottom drums operating at regulatable variable speeds to provide optimum picking action which varies as the poultry passes along the picking apparatus, said apparatus being economical to use, to manufacture and to assemble.

The novel features which are believed to be characteristic of the invention are set forth with particularity in the appended claims. The invention itself, however, together with further objects and advantages thereof, will best be understood by reference to the following description taken in connection with the accompanying drawings, in which:

FIGURE 4 is an end view of the poultry picking apparatus of FIGURE 1, partly in section, showing the top drums and one bottom drum of the apparatus;

FIGURE 5 is a fragmentary, slightly enlarged, view of the poultry picking apparatus of the present invention schematically representing the picking action upon a fowl; and FIGURE 6 is a sectional view of one of the bottom drums of the poultry picking apparatus of the present invention showing the finger mounting means thereon and the resilient fingers mounted therein.

Figure 1:
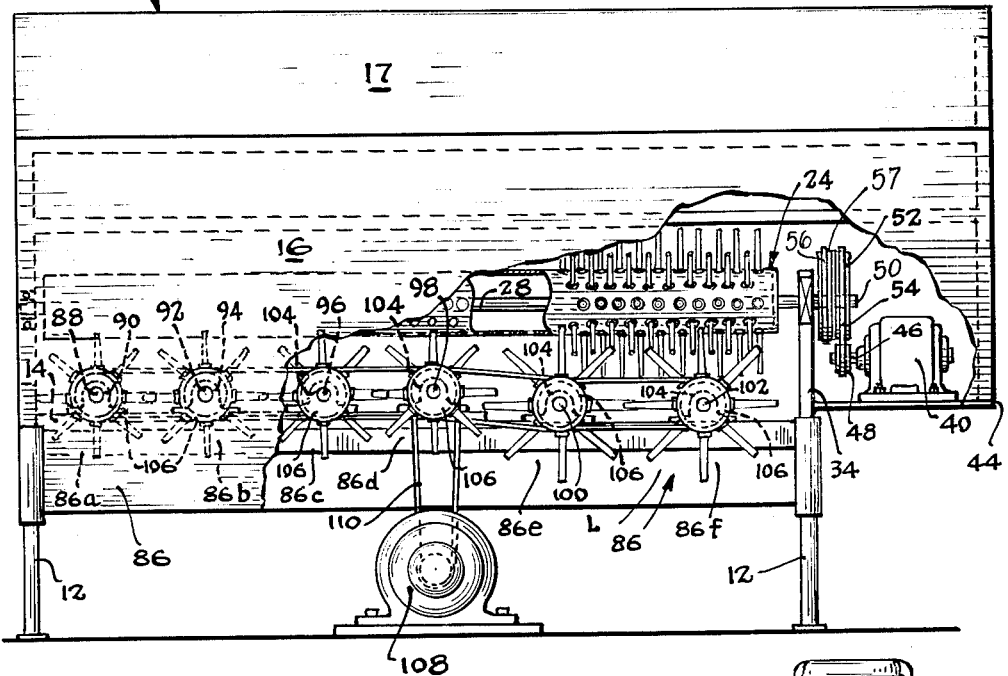
FIGURE 1 is a side view of the poultry picking apparatus of the present invention, partly in section.

Referring more particularly now to FIGURE 1 of the drawings the picking apparatus of the present invention is illustrated generally at 10. As shown in FIGURES 1 and 4, the picking apparatus includes vertical support posts 12 to support the main body of the picking apparatus. Horizontal support bars 14, supported from the vertical support posts 12, are adapted to position and carry the main body of the picking apparatus, as illustrated in FIGURE 4 of the drawings.

Side walls 16 and 18 define side enclosures for the apparatus; the upper portion of each of the side walls extend in generally arced fashion to define a partial top cover for the poultry picking apparatus, as indicated more clearly in FIGURE 4. Top panels 17 and 19 extend upwardly above the side walls to define the upper side enclosure for the apparatus, said panels 17 and 19 terminating at their uppermost extremity in spaced relation to define a continuous path 20 extending along said picking apparatus and to permit access for support members of the conveyor means 22 extending through said apparatus 10.

A pair of top drums 24 and 26 are rotatably supported within the apparatus 10 upon shafts 28 and 30, respectively. The shafts 28 and 30 are supported at either end in a bearing trunnion 32 which trunnion, in turn, is supported upon means 34 affixed to the horizontal support bars 14.

The shafts 28 and 30 each extend outwardly, beyond their respective support trunnions, at one end thereof, as illustrated at 29 for shaft 28. The outward extension 29 of each of the shafts 28 and 30 are adapted to carry drive pulleys 36 and 38, respectively, which pulleys are non-rotatably secured to their respective shafts.

Drive motors 40 and 42 are supported by the support members of the apparatus in the position indicated generally in FIGURES 1 and 4 of the drawings. The motors may be secured to the frame support of the apparatus by bolting thereto, or in any other convenient manner. As shown in FIGURE 1 a horizontal extension support member 44 is rigidly affixed to the horizontal and vertical support members of the picking apparatus and provides means for mounting of the drive motors 40 and 42 of the picking apparatus. A shaft 46 extends from each motor 40 and 42 and is provided with a pulley 48 at the outer terminal thereof.

An upper pulley shaft 50 is rotatably supported by the support members of the apparatus 10. The shaft 50 carries a pulley 52 which is drivingly interconnected to the motor pulley 48 by a suitable drive belt 54. A second pulley 57 on the shaft 50 is drivingly interconnected to the drive pulley 36 of the shaft 28 by a drive belt 56 to define a completed driving linkage between the drive motor 40 and the shaft 28.

The shaft 30 is drivingly interconnected to its drive motor 42 in the same manner as set forth hereinabove with respect to the shaft 28. That is, the outer terminal shaft of the motor 42 is provided with a pulley 58 which is drivingly connected by a drive belt 60 to a first pulley 62. The pulley 62 is mounted on a shaft 64 which shaft is rotatably supported by the support members of the apparatus 10. A second pulley (not shown) is mounted on shaft 64 of the apparatus and is drivingly interconnected by a belt 66 to the pulley 38 of the shaft 30 to define a completed drive linkage between the drive motor 42 and the shaft 30.

The drive motors 40 and 42 and interconnecting drive linkages to the shafts 28 and 30 are arranged such that the motors 40 and 42 drive the drums 24 and 26 in counter rotating motion during operation of the apparatus, as indicated by the drum rotation arrows of FIGURE 4. In this manner, when a fowl is passed along the continuous path defined by the space 20 the fingers attached to the drums 24 and 26 will each pass along the bird in a downwardly direction to wipe the feathers therefrom, as set forth in greater detail hereinbelow. This counter rotating two drum mechanism may be, and often is, employed for defeathering poultry. There are limitations to its use however, particularly in that it is not satisfactory for picking the backs of the wings (when the fowl is suspended in inverted fashion as schematically illustrated in FIGURE 5), the shoulders, neck or head. To the extent further processing is generally required to completely defeather the fowl with attendant increase in processing times.

Figure 2:
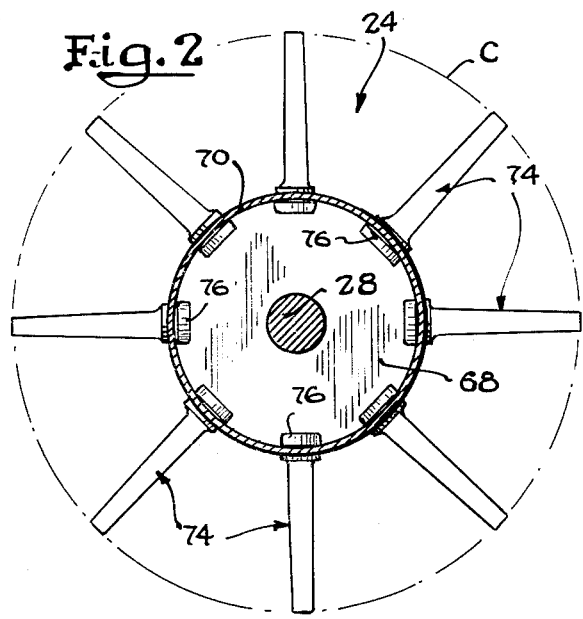
FIGURE 2 is an enlarged sectional view of one of the picking drums of the picking apparatus.
Figure 3:
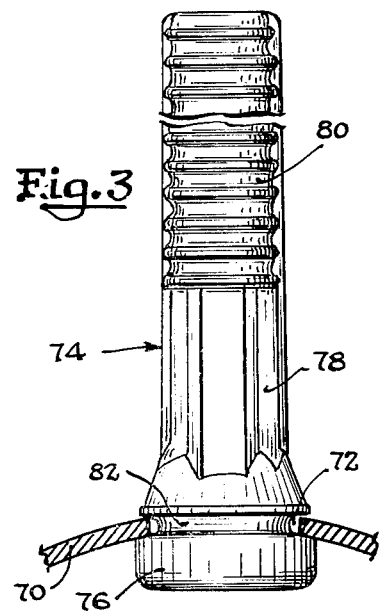
FIGURE 3 is a fragmentary enlarged view of one section of the drums showing the finger mounting means of the drum and a resilient finger mounted thereon.

Each of the drums 24 and 26 is identical in structural details, such details being represented in FIGURES 2 and 3 of the drawings particularly with respect to drum 24. As indicated the drum is supported by the end plates 68 (only one shown), said end plates being non-rotatably secured to the shafts of the drums. An outer shell 70 is affixed at either terminal thereof to the circular end plates 68 of the drums, said outer shell 70 being affixed to the end plates 68 by welding, riveting, bolting, or other suitable fastening means. The outer shell of each of the drums 24 and 26 is provided with a series of openings 72 extending therethrough at spaced intervals thereabout. The openings 72 preferably are circular in shape but may be modified to accommodate any finger shape. The fingers 74 include a head portion 76, shank 78 and picking portion 80. The head portion 76 of each finger includes a groove or recess 82 therein. The recess 82 is of approximately the same diameter at the base thereof as the outer diameter of the openings 72 of the outer shell 70 with the major head portion 76 of the fingers being substantially larger than said openings 72 along both sides of said recess. The fingers are mounted within the opening 72 of the shell 70 by forcing the head 76 of each finger into said opening until the recess is in registration with the opening 72. The finger thus is affixed to the shell in releasable fashion with the picking portion 80 extending radially outwardly of the drum. As indicated in FIGURE 1 of the drawings, the fingers extend fully along the length of the drum to provide a large picking area within the picking apparatus.

The apparatus 10 is further provided with a series of lower or bottom drums, indicated generally at 86, and identified specifically at 86a, 86b, 86c, 86d, 86e and 86f.

The drum 86a is mounted on a shaft 88 which shaft is rotatably mounted in a trunnion 90 at either end thereof. The trunnion 90 is affixed to the horizontal support member 14 of the apparatus 10. The drum 86b is mounted on shaft 92 which shaft is supported for rotation at either end by a trunnion 94, said trunnion being affixed to the horizontal support member 14 of the apparatus 10. Each of the succeeding drums 86c, 86d, 86e and 86f are likewise mounted on shafts 96, 98, 100 and 102, respectively, each of said shafts being supported for rotation by trunnions 104 affixed to the member 14.

Each of the drums 86 is provided with a drive pulley 106 affixed to the shaft of each of said drums.

A drive motor 108 is drivingly interconnected to the pulley 106 of shaft 98, drum 86d, by a belt drive member 110. Each of the shafts of the drums 86 are drivingly interconnected to each other and to the drum 86d. In this manner the drums 86 are driven collectively from the drive motor 108. The velocity of the separate drums will be determined by the ratio of pulley diameters of the driven drum and interconnecting drums to the pulley of the drive motor 108. It can readily be seen, therefore, that the drum velocity may be varied by varying the pulley diameter. If greater velocity control is desired over a wide range and in convenient form, a drive motor may be directly drivingly connected to each drum separately thereby permitting drum velocity control by the r.p.m.'s of each motor.

The lower or bottom drums 86 are constructed in the same manner as the upper drums 24 and 26. As illustrated in FIGURE 6 of the drawings end plates 112 are affixed to the shafts of the drums 86 by welding (as illustrated) or by other fastening means. An outer shell 114 is affixed to the end plates by welding, bolting, or the like, to provide an enclosed drum member. The outer shell 114 of the drums are provided with openings 116 extending through the wall at radially spaced intervals thereabout. Fingers 74 are adapted to be received within the openings 116 of the drums 86 in the same manner as set forth hereinabove in conjunction with the discussion of the drums 24 and 26. The picking portion of each of the fingers of the drums 86 is adapted to extend radially outwardly from the outer shell of said drums.

In operation of the apparatus of the present invention a fowl 118 is suspended in inverted fashion from a shackle 120, which shackle, in turn, is suspended from a continuous conveyor means 22. The conveyor means 22 of the processing line is adapted to pass the fowl 118 through the apparatus at a predetermined rate for optimum processing time through the entire sequence including packaging of the fully processed fowl. As the fowl 118 is moved along the continuous path 20 defined along the apparatus 10 it is engaged along either side thereof by the fingers 74 extending from the drums 24 and 26 positioned along either side of the path 20 defined through said apparatus. The flexible fingers 74 impart a wiping action against the fowl 118 and tend to remove the feathers from the fowl by such action. It should be observed that prior to the defeathering operation the fowl is exposed to high temperature water to loosen the feathers from the epidermal attachment to permit easier processing and removal of said feathers. As the fowl moves along the line the counter rotating drums press the fingers 74 thereagainst in a continuing wiping action the fowl 118 moving through the apparatus at a rate determined by the rate of conveyor travel. The wiping action of the fingers 74 of the drums 24 and 26 tends to urge the fowl downwardly along both sides thereof. This tends to place the bird in tension upon the shackle and may cause it to oscillate as it passes along the processing line thereby giving rise to bruising conditions. The oscillatory action and the tension upon the bird, however, is fully relieved with the addition of the lower or bottom picking drums 86.

The lower drums 86 tend to support the bird as it travels along the picking apparatus and thereby avoids a condition that may give rise to placing the bird in tension upon the suspension means. Further, the lower drums 86 of the apparatus engage the bottom portion of the wings of the fowl (as illustrated in FIGURE 5), the neck, shoulders and heads of the fowl to remove the feathers therefrom in these areas. It can readily be seen that with only the drums 24 and 26 in the processing line it is not possible to defeather these areas during a continuous path through the apparatus. The outer periphery of the fingers 74 of the drums 24 and 26 define a base cylinder C. The base cylinders defined by the counter rotating drums 24 and 26 are, in the embodiment illustrated herein, and generally, in spaced relation along the path defined through the apparatus so that fowl may pass therethrough without a large downward force acting thereupon. The base cylinder arcs away from the fowl along the lower portion thereof, as it must to assure picking of the major body portions from the legs, body and upper wing surfaces. It can be seen that it is not possible to defeather the remaining portions of the bird with the fingers of the drums 24 and 26 in a continuous passage through the picking apparatus.

The outer extremity of the fingers 74 of the lower drums 86, when operating, define a base cylinder L the axis of which is angularly disposed with respect to the axis of the base cylinder C defined by the drums 24 and 26. In the form shown herein the axes of the base cylinders C and L are disposed substantially at right angles with respect to each other.

The fingers of the top drums 24 and 26 will act to defeather the legs, body and upper wing portions, and will act to spread the wings of the fowl as it passes along the apparatus. The fingers of the bottom drums will act to pick under the wings, and along the neck, shoulders and heads of the fowl. The fingers of the bottom drum act further to hold the fowl up against the downward wiping action of the counter-rotating drums 24 and 26 to prevent damage of the fowl by the top drums by avoiding placing the bird in tension upon its suspension means. This support by the bottom drums thereby avoids bouding and free motion of the bird as it passes along the continuous path defined through the apparatus.

The lower drums may be rotated in sequentially opposite directions to provide optimum picking action against both sides of the fowl as it passes through the picking apparatus. The speed of the lower drums also may be varied to vary the position of the fowl with respect to drums 24 and 26 of the apparatus. In this manner the picking character of the apparatus may be varied. High speed operation, for example, is better adapted for removal of the heavy body feathers in optimum processing time. With the apparatus of the present invention the bottom drums may be rotated at relatively high velocities near the entrance of the apparatus to give high speed picking operation and slowed near the exit end of the apparatus to provide a better finishing picking control.

Thus it is seen that both the motion of the bird through the apparatus may be controlled with the bottom drums and the position of the fowl with respect to the picking drums may be varied and controlled with the variable speed bottom drums. This control, of course, is independent of the speed of conveyor travel and permits another independent variable in the processing line for optimum processing of the poultry.

While a specific embodiment of the present invention is shown and described it will, of course, be understood that other modifications and alternative constructions may be used without departing from the true spirit and scope of the invention. It is intended by the appended claims to cover all such modifications and alternative constructions as fall within their true spirit and scope.

What I claim as new and desire to secure by Letters Patent of the United States is:

1. An improved poultry picking apparatus comprising:
a pair of spaced picking drums that define a path of travel for the passage of poultry therebetween mounted for rotation about axes that lie outwardly of and along said path;
and at least one picking drum in said path that is rotatably mounted on an axis that is vertically spaced from said first mentioned axes and is substantially transverse to said path.

2. An improved poultry picking apparatus comprising:
a pair of spaced picking drums rotatably mounted about substantially horizontal axes defining a continuous path of travel for the passage of poultry therebetween;
and at least one transverse picking drum rotatably mounted below and in said path of travel with its axis being substantially normal to the axes of said first pair of picking drums.

3. Poultry picking apparatus comprising, in combination:
a pair of transversely spaced drums defining a continuous path for the passage of poultry therebetween mounted for rotation in opposite directions about substantially horizontal axes;
and a plurality of drums disposed below said continuous path, each mounted for rotation about an axis that is substantially normal to said path.

4. An improved poultry picking apparatus comprising:
a pair of picking drums defining a continuous path for the passage of poultry therebetween, one drum being rotatably mounted on each side of said continuous path with the axis thereof substantially parallel to said continuous path;
each of said drums having a plurality of resilient fingers extending therefrom into the path defined through said apparatus, the outer terminals of the fingers, when each drum is rotating, defining a base cylinder, said base cylinders being in spaced relation along the length of said path;
and a plurality of picking drums rotatably mounted about axes that are below and substantially normal to said path, each of said plurality of said picking drums having a plurality of resilient fingers extending radially outward and into the path defined through said apparatus.

5. An improved poultry picking apparatus for a continuous processing line having conveyor means with poultry suspended therefrom and carried along said line at a predetermined rate comprising:
a first pair of upper picking drums defining therebetween a continuous path of travel for poultry through said apparatus, one of said upper picking drums being disposed on each side of said path with its axis parallel to said path, said drums being rotatable in opposed direction to impart a wiping action against the poultry as it passes along the path through the apparatus;
and a plurality of lower picking drums each rotatably mounted on an axis that is substantially normal to the axes of said upper pair of picking drums, said plurality of lower picking drums defining the bottom of said path defined between said upper drums;

and means for operating at least some of the plurality of lower drums in a direction opposite to the direction of conveyor travel along said path.

6. An improved poultry picking apparatus for a continuous processing line having conveyor means with poultry suspended therefrom and carried thereby along said line at a predetermined rate, comprising:

an upper pair of picking drums defining therebetween a continuous path for poultry through said apparatus, one of each of said pair being disposed on each side of said path with its axis substantially parallel to said path;

means for rotating said drums in opposite directions to impart a downward wiping action against poultry as it passes along the path through the apparatus;

and a plurality of lower picking drums each mounted for rotation below said upper drums and defining the bottom of said path of travel.

7. Poultry picking apparatus comprising, in combination:

support means;

a pair of drums rotatably mounted on said support means about axes that are substantially parallel to said path and defining a continuous open path therebetween;

means for rotating said drums in opposite directions;

resilient fingers mounted on each of the drums extending outwardly, the outer portion of each finger of each drum when rotating extending into said path;

a plurality of lower drums defining a bottom of said path mounted on said support means at a right angle to the path defined between said upper drums;

means for rotating at least some of said lower drums in a direction whereby their upper surfaces move in a direction opposite to the direction of travel of the poultry in said path;

and resilient fingers mounted on each of said lower drums and extending outwardly into said path.

8. A poultry picking apparatus comprising, in combination:

support means;

power means mounted on said support means;

a pair of transversely spaced upper drums rotatably mounted about substantially horizontal axes on said support means defining a continuous open path therebetween, each of said drums having finger mounting means thereon;

means for rotating said upper drums from said power means in opposite directions;

resilient fingers mounted on the finger mounting means on each of said drums and extending outwardly therefrom, the outer portion of each finger on each drum, when rotating with the drum, extending into said path;

a plurality of lower drums having finger mounting means thereon, each rotatably mounted on said support means below said pair of upper drums at a substantially right angle to the path defined between said pair of upper drums;

means for rotating said lower drums from said power means with the upper surfaces traveling in a direction opposite to the direction of travel of the poultry through said apparatus;

resilient fingers mounted in the finger mounting means on each of said lower drums to extend outwardly therefrom, the outer portion of each finger, when rotating with said plurality of drums, extending into said path in spaced relation to the outer portion of fingers of said pair of upper drums.

References Cited by the Examiner

UNITED STATES PATENTS 2,012,655   8/35   Bowman.
2,389,405   11/45  Barker _____ 17—11.1

FOREIGN PATENTS 102,939   1/38   Australia.

SAMUEL KOREN, *Primary Examiner.*

LUCIE H. LAUDENSLAGER, *Examiner.*